(12) United States Patent
Kim

(10) Patent No.: US 7,738,584 B2
(45) Date of Patent: Jun. 15, 2010

(54) BEAMFORMING IN A WIRELESS COMMUNICATION WITH A PARTIAL ESTIMATION TO REDUCE OVERHEAD

(75) Inventor: Joonsuk Kim, San Jose, CA (US)

(73) Assignee: Broadcom Company, Irvine, CA (US)

( * ) Notice: Subject to any disclaimer, the term of this patent is extended or adjusted under 35 U.S.C. 154(b) by 1141 days.

(21) Appl. No.: 11/168,838

(22) Filed: Jun. 28, 2005

(65) Prior Publication Data

US 2006/0239373 A1    Oct. 26, 2006

Related U.S. Application Data

(60) Provisional application No. 60/673,451, filed on Apr. 21, 2005, provisional application No. 60/674,822, filed on Apr. 26, 2005.

(51) Int. Cl.
*H04L 1/02* (2006.01)
(52) U.S. Cl. ............... 375/267; 375/299; 375/219; 375/221; 375/222; 375/259; 375/260
(58) Field of Classification Search ............ 375/260, 375/267, 299, 219, 221, 259
See application file for complete search history.

(56) References Cited

U.S. PATENT DOCUMENTS

| 3,858,221 | A | * | 12/1974 | Harrison et al. | ............ | 343/815 |
| 3,916,533 | A | * | 11/1975 | Kijesky | ............ | 434/9 |
| 4,843,631 | A | * | 6/1989 | Steinpichler et al. | ........ | 382/280 |
| 5,541,607 | A | * | 7/1996 | Reinhardt | ............ | 342/372 |
| 2005/0141624 | A1 | * | 6/2005 | Lakshmipathi et al. | ...... | 375/260 |
| 2005/0286663 | A1 | * | 12/2005 | Poon | ............ | 375/347 |
| 2006/0067428 | A1 | * | 3/2006 | Poon | ............ | 375/299 |
| 2006/0068738 | A1 | * | 3/2006 | Li et al. | ............ | 455/277.1 |
| 2006/0155534 | A1 | * | 7/2006 | Lin et al. | ............ | 704/223 |
| 2006/0234645 | A1 | * | 10/2006 | Lin et al. | ............ | 455/69 |

OTHER PUBLICATIONS

"Interpolation Based Transmit Beamforming for MIMO-OFDM with Partial Feedback" by Jihoon Choi and Robert W. Heath, Jr. The University of Texas at Austin, Dept. of Electrical & Computer Engineering, Wireless Networking & Communications Group; Sep. 16, 2003; p. 1-14.
"Digital Beamforming Basics (Antennas)" by Hans Steyskal; Journal of Electronic Defense; Jul. 1, 1996 (7 pages).
"Utilizing Digital Downconverters for Efficient Digital Beamforming" by Clint Schreiner, Red River Engineering (5 pages).

* cited by examiner

*Primary Examiner*—Shuwang Liu
*Assistant Examiner*—Michael R Neff
(74) *Attorney, Agent, or Firm*—Garlick Harrison & Markison; Timothy W. Markison; Jessica W. Smith

(57) ABSTRACT

A method for beamforming in a wireless communication begins by receiving a baseband signal. The method continues by receiving a feedback signal that includes a subset of angles, wherein a set of angles provide polar coordinates for a unitary matrix and wherein the subset of angles is a subset of the set of angles. The method continues by determining at least one remaining angle of the set of angles based on the subset of angles. The method continues by determining the polar coordinates for the unitary matrix. The method continues by digitally beamforming the baseband signal using the unitary matrix.

11 Claims, 8 Drawing Sheets

BEAMFORMING IN A WIRELESS COMMUNICATION WITH A PARTIAL ESTIMATION TO REDUCE OVERHEAD

This patent application is claiming priority under 35 USC §119(e) to provisional patent application entitled "Reduced Feedback For Beamforming in a Wireless Communication", having a provisional filing date of Apr. 21, 2005, and an application number of No. 60/673,451. This patent application also claims priority to a provisionally filed patent application entitled "Beamforming in a Wireless Communication", having a provisional filing date of Apr. 26, 2005, and an application number of No. 60/674,822.

BACKGROUND OF THE INVENTION

1. Technical Field of the Invention

This invention relates generally to wireless communication systems and more particularly to wireless communications using beamforming.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

To further improve wireless communications, transceivers may incorporate beamforming. In general, beamforming is a processing technique to create a focused antenna beam by shifting a signal in time or in phase to provide gain of the signal in a desired direction and to attenuate the signal in other directions. In order for a transmitter to properly implement beamforming, it needs to know properties of the channel over which the wireless communication is conveyed. Accordingly, the receiver must provide feedback information for the transmitter to determine the properties of the channel. The feedback information may be sent as a receiver determined beamforming matrix (V) if a singular value decomposition can be determined or it may be sent as a channel matrix (H). In either case, the feedback information is substantial in size and includes Cartesian coordinates for the matrix values. Such Cartesian coordinates leads to unevenly spaced angles. Prior art papers (1) Digital beamforming basics. (antennas) by Steyskal, Hans, Journal of Electronic Defense, Jul. 1, 1996; (2) Utilizing Digital Downconverters for Efficient Digital Beamforming, by Clint Schreiner, Red River Engineering, no publication date; and (3) Interpolation Based Transmit Beamforming for MIMO-OFMD with Partial Feedback, by Jihoon Choi and Robert W. Heath, University of Texas, Department of Electrical and Computer Engineering, Wireless Networking and Communications Group, Sep. 13, 2003.

Therefore, a need exists for a method and apparatus for reducing beamforming feedback information for wireless communications.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
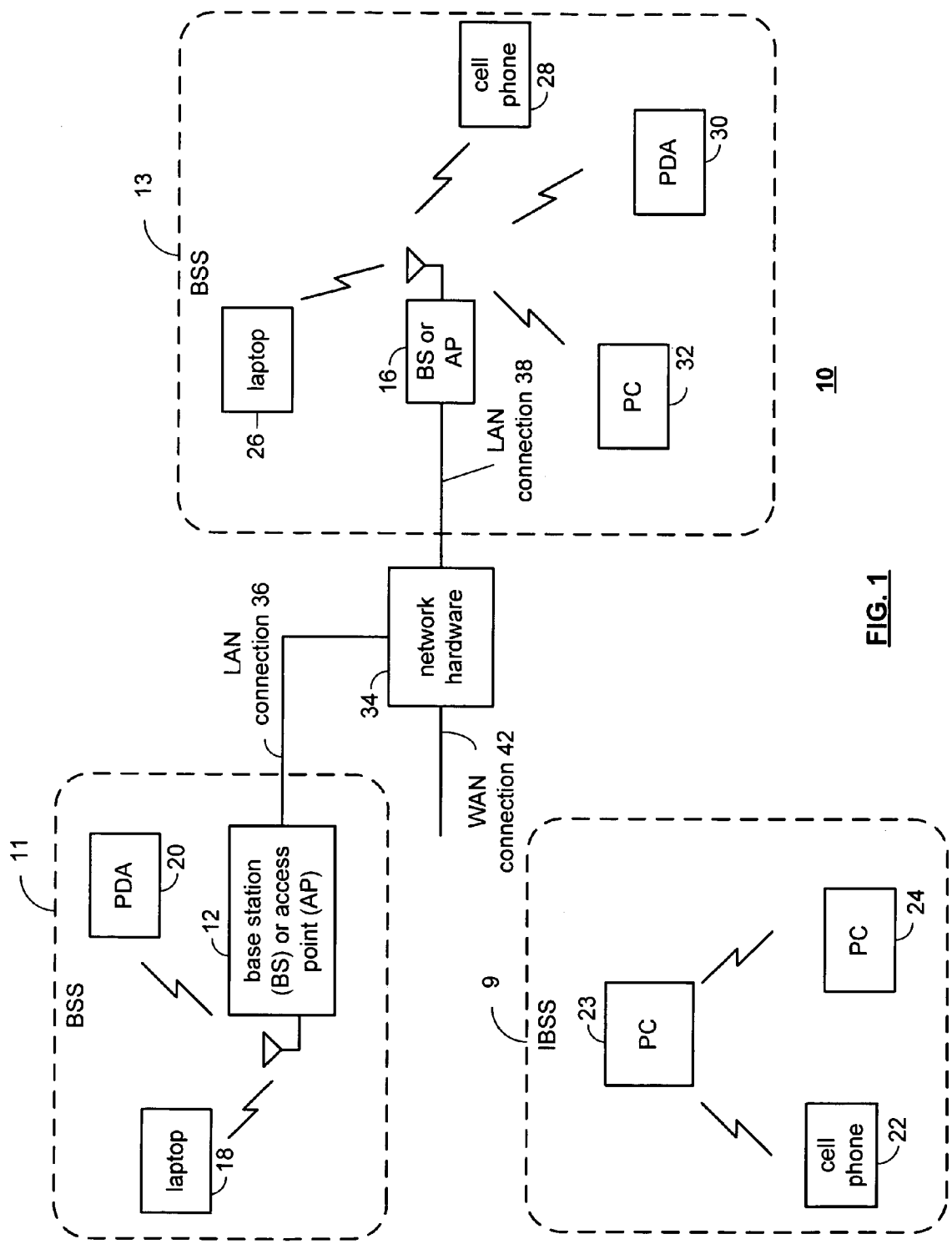
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
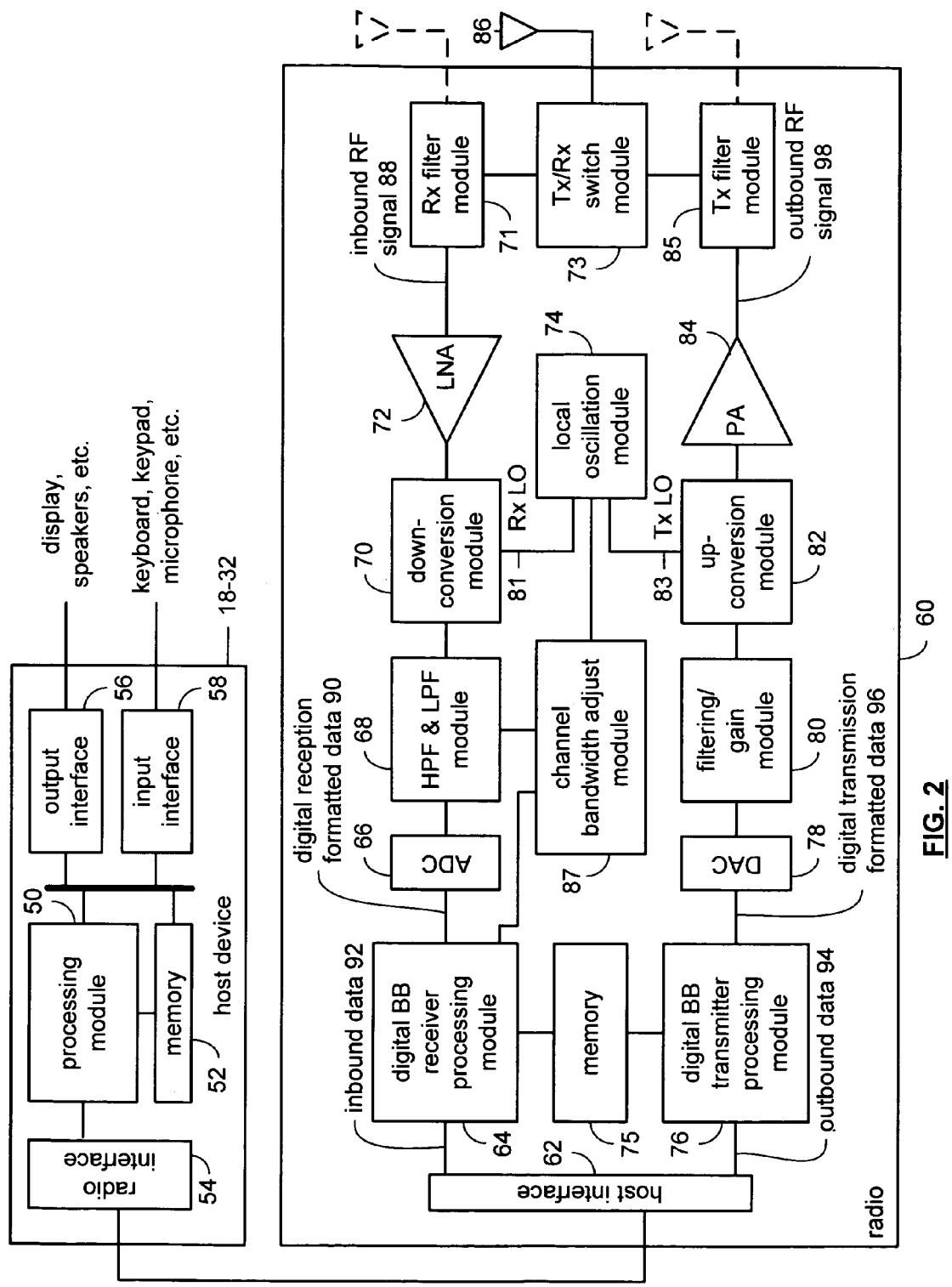
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
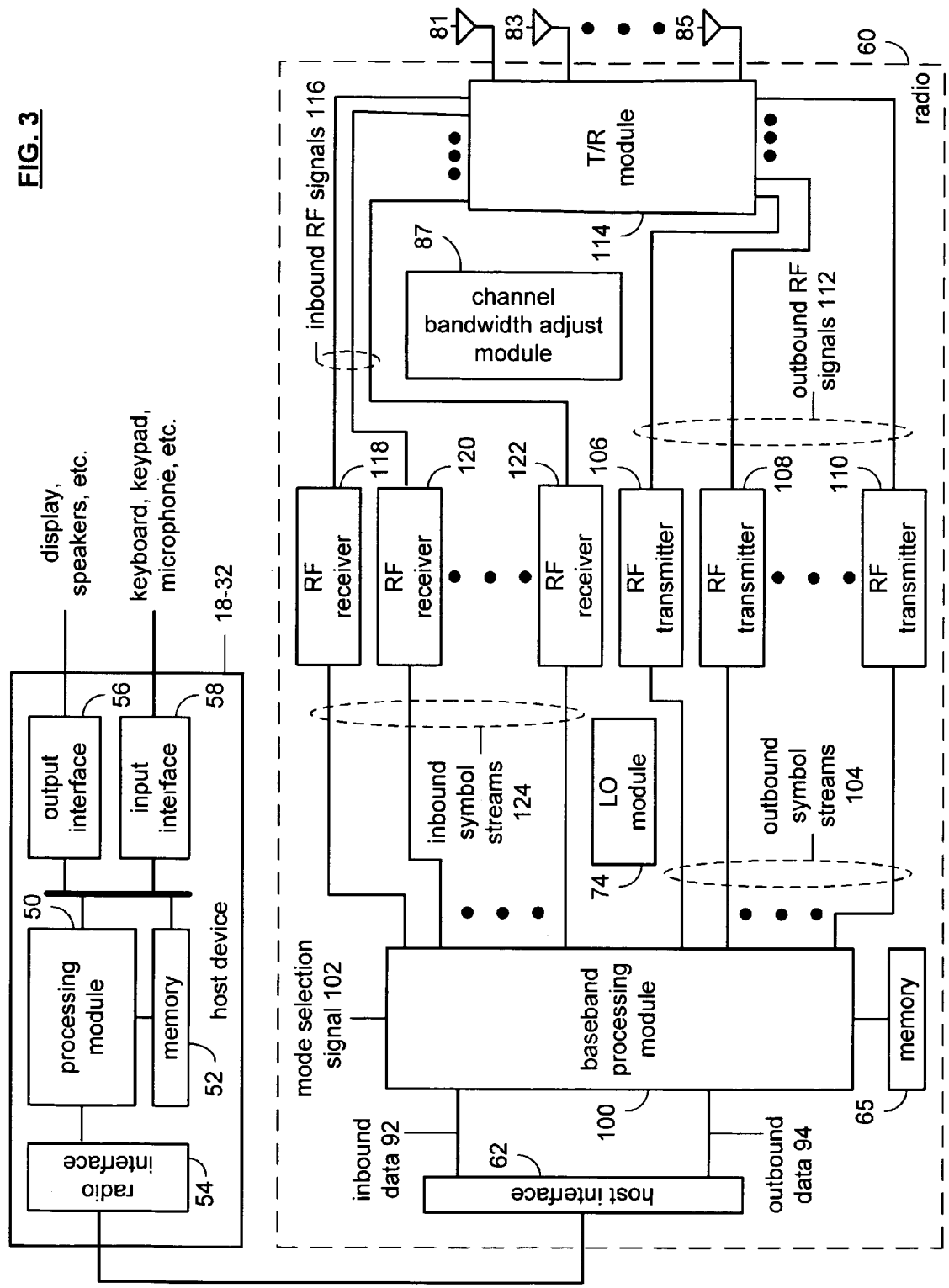
FIG. 3 is a schematic block diagram of another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122, which will be described in greater detail with reference to FIG. 4. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
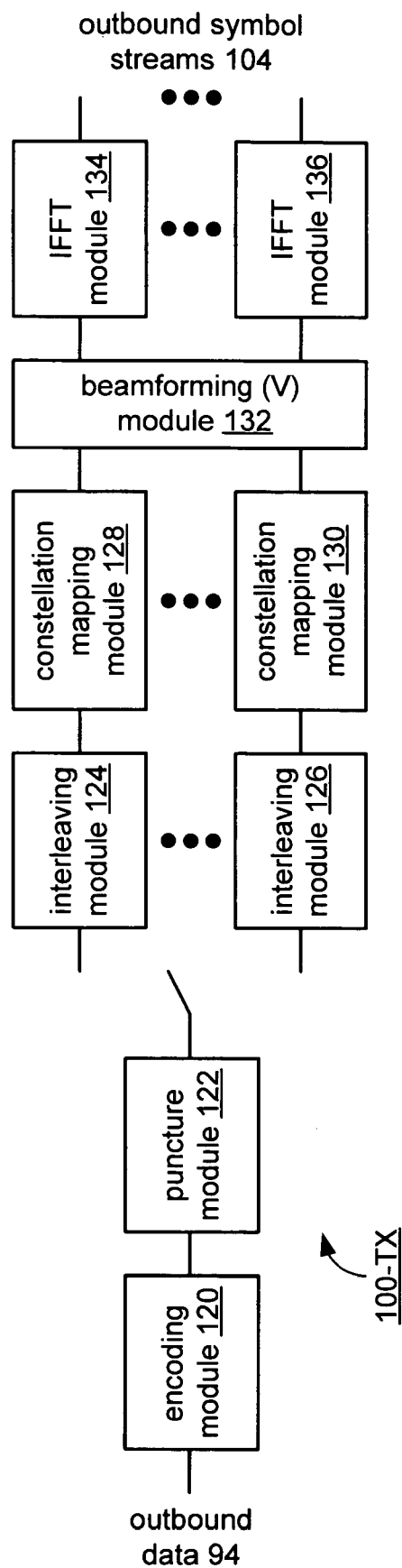
FIG. 4 is a schematic block diagram of baseband transmit processing in accordance with the present invention.

FIG. 4 is a schematic block diagram of baseband transmit processing 100-TX within the baseband processing module 100, which includes an encoding module 120, a puncture module 122, a switch, a plurality of interleaving modules 124, 126, a plurality of constellation encoding modules 128, 130, a beamforming module (V) 132, and a plurality of inverse fast Fourier transform (IFFT) modules 134, 136 for converting the outbound data 94 into the outbound symbol stream 104. As one of ordinary skill in the art will appreciate, the baseband transmit processing may include two or more of each of the interleaving modules 124, 126, the constellation mapping modules 128, 130, and the IFFT modules 134, 136. In addition, one of ordinary skill in art will further appreciate that the encoding module 122, puncture module 122, the interleaving modules 124, 126, the constellation mapping modules 128, 130, and the IFFT modules 134, 136 may be function in accordance with one or more wireless communication standards including, but not limited to, IEEE 802.11a, b, g, n.

In one embodiment, the encoding module 120 is operably coupled to convert outbound data 94 into encoded data in accordance with one or more wireless communication standards. The puncture module 122 punctures the encoded data to produce punctured encoded data. The plurality of interleaving modules 124, 126 is operably coupled to interleave the punctured encoded data into a plurality of interleaved streams of data. The plurality of constellation mapping modules 128, 130 is operably coupled to map the plurality of interleaved streams of data into a plurality of streams of data symbols. The beamforming module 132 is operably coupled to beamform, using a unitary matrix having polar coordinates, the plurality of streams of data symbols into a plurality of streams of beamformed symbols. The plurality of IFFT modules 124, 136 is operably coupled to convert the plurality of streams of beamformed symbols into a plurality of outbound symbol streams.

The beamforming module 132 is operably coupled to multiply a beamforming unitary matrix (V) with baseband signals provided by the plurality of constellation mapping modules 128, 130. The beamforming unitary matrix V used by the beamforming module 132 satisfies the conditions of "V*V=VV*=I", where "I" is an identity matrix of [1 0; 0 1] for 2×2 MIMO wireless communication, is [1 0 0; 0 1 0; 0 0 1] for 3×3 MIMO wireless communication, or is [1 0 0 0; 0 1 0 0; 0 0 1 0; 0 0 0 1] for 4×4 MIMO wireless communication. In this equation, V*V means "conjugate (V) times V" and VV* means "V times conjugate (V)". Note that V may be a 2×2 unitary matrix for a 2×2 MIMO wireless communication, a 3×3 unitary matrix for a 3×3 MIMO wireless communication, and a 4×4 unitary matrix for a 4×4 MIMO wireless communication. Further note that for each column of V, a first row of polar coordinates including real values as references and a second row of polar coordinates including phase shift values.

In one embodiment, the constellation mapping modules 128, 130 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map. For instance, a 16 QAM (Quadrature Amplitude Modulation) includes 16 constellation points, each corresponding to a different symbol. For an OFDM signal, the beamforming module 132 may regenerate the beamforming unitary matrix V for each tone from each constellation mapping module 128, 130, use the same beamforming unitary matrix for each tone from each constellation mapping module 128, 130, or a combination thereof.

The beamforming unitary matrix varies depending on the number of transmit paths (i.e., transmit antennas—M) and the number of receive paths (i.e., receiver antennas—N) for an M×N MIMO communication. For instance, for a 2×2 MIMO communication, the beamforming unitary matrix may be:

$$V = (V)ij = \begin{bmatrix} \cos\psi_1 & \cos\psi_2 \\ \sin\psi_1 e^{j\phi_1} & \sin\psi_2 e^{j\phi_2} \end{bmatrix}$$

In order to satisfy V*V=I, it needs to satisfy followings.

$$\cos\psi_1 \cos\psi_2 + \sin\psi_1 \sin\psi_2 e^{j(\phi_1-\phi_2)} = 0$$

$$\cos\psi_1 \cos\psi_2 + \sin\psi_1 \sin\psi_2 e^{j(\phi_2-\phi_1)} = 0$$

wherein absolute value of $\psi_1 - \psi_2 = \pi/2$ and $\Phi_1 = \Phi_2$ or $\Phi_1 = \Phi_2 + \pi$ and $\psi_1 + \psi_2 = \pi/2$.

Therefore, with $\Phi_1$ and $\psi_1$, the beamforming module 132 may regenerate V per each tone. Using the property of phase invariance of V(f), a further bit reduction may be achieved. Accordingly, when $\cos(\psi i)<0$, that is $\pi/2 < \psi i < \pi$, V can be modified to make it positive as follows, $$H = UDV^*$$
$$= UD[-1\ 0;\ 0\ 1][-1\ 0;\ 0\ 1]V^*$$
$$= U[-1\ 0;\ 0\ 1]DV\_new^*$$
$$= U\_new DV\_new^*$$

where U_new=U[-1 0; 0 1], and V_new=V [-1 0; 0 1]. Then the first element of V_new can be positive with $0 < \psi i < \pi/2$ to have $\cos(\psi i)>0$. Then, an index bit may not be needed to indicate the relationship between ψ1 and ψ2 or Φ1 and Φ2, but they need to satisfy Φ1=Φ2+π and ψ1+ψ2=π/2 from above equations for V*V=I. For instance, to accommodate the various possible V values, the angles should have a range of ψ in [0, π/2], Φ in [0, 2π]. In order to satisfy V*V=VV*=I, the set of angles need to satisfy Φ1=Φ2+π and ψ1+ψ2=π/2. Thus, only angles $\Phi_1$ and $\psi_1$, need to be transmitted in the feedback signal.

Figure 7:
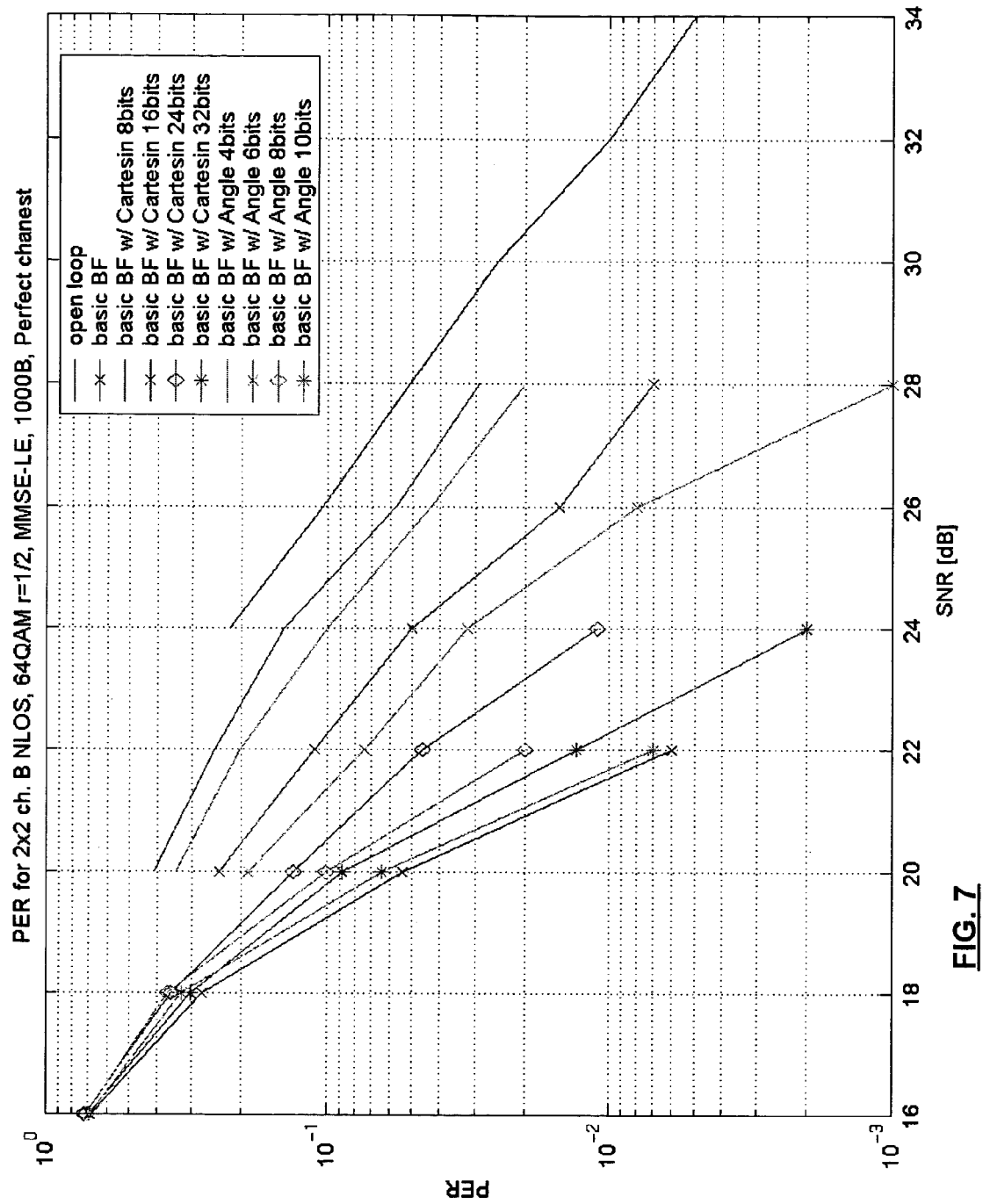
FIG. 7 is a diagram of simulation results in accordance with the present invention.

With angle resolution of $\pi/2^a$, where "a" equals the number of bits per angle, the total number of bits per tone is (a−1)+(a+1)=2a to cover [0,π/2] and [0,2π], respectively, Note that the bits may be divided such that "a−1" bits are for angle $\psi_1$ and "a+1" bits are for $\Phi_1$. Note that 'a=1' corresponds to a quantized angle that is [π/4, 3π/4] to cover [0, π] with angle resolution of π/2. Further note that 'a=2' corresponds to a quantized angle that is [π/8, 3π/8, 5π/8, 7π/8] to cover [0, π] with angle resolution of π/4. Still further note that to achieve full resolution BF performance, polar coordinates need 10 bits per tone for V(f), while Cartesian coordinates need 40 bits per tone for V(f). Refer to FIG. 7 for simulation results that depict one of the worst cases with strong coding rate at less frequency selective channels.

For a 3×3 MIMO communication, the beamforming unitary matrix may be:

$$V = (V)ij = \begin{bmatrix} \cos\psi_1 & \cos\psi_2 & \cos\psi_3 \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} \end{bmatrix}$$

wherein $\psi_1, \psi_2, \psi_3, \theta_1, \theta_2, \theta_3, \Phi_{21}, \Phi_{22}, \Phi_{23}, \Phi_{31}, \Phi_{32}, \Phi_{33}$ represent angles of the unit circle, wherein Diagonal (V*V)=1s, and wherein:

$$\psi_i = \cos^{-1} V_{1i}, \theta_i = \cos^{-1}\left|\frac{V_{2i}}{\sin\psi_{3i}}\right|$$

$$\phi_{2i} = \angle(V_{2i}), \phi_{3i} = \angle(V_{3i})$$

In this example, with 12 angles, the beamforming module 132 may regenerate V as a 3×3 matrix per tone. With 4-bits for expression for the angles, a 54 tone signal may have feedback information of 324 bytes (e.g., 4×12×54/8).

As an alternate example, only seven of the twelve angles need to be included in the feedback signal and the beamforming module can calculate the remaining five angles. In this example, let $\psi_1, \psi_2, \psi_3, \theta_1, \theta_2, \theta_3, \Phi_{21}, \Phi_{22}, \Phi_{23}, \Phi_{31}, \Phi_{32}, \Phi_{33}$ represent the set of angles, wherein $\psi_1, \psi_2, \theta_1, \theta_2, \Phi_{21}, \Phi_{22}$, and $\Phi_{33}$ are included in the subset of angles, wherein $\psi_3, \theta_3, \Phi_{21}, \Phi_{23}, \Phi_{32}$, and $\Phi_{33}$ are subsequently determined. In this example, to accommodate the various possible V values, the angles should range from $\psi$ in $[0, \pi/2]$, $\theta$ in $[0, \pi/2]$, $\Phi$ in $[-\pi, \pi]$ In order to satisfy $V^*V=VV^*=I$, $\psi_3$=function($\psi_1, \psi_2$)
$\theta_3$=function($\psi_1, \psi_2, \psi_3, \theta_1, \theta_2$)
$\Phi_{23}$=function($\psi_1, \psi_2, \psi_3, \theta_1, \theta_2, \theta_3, \Phi_{21}, \Phi_{22}$)
$\Phi_{32}$=function($\psi_1, \psi_2, \psi_3, \theta_1, \theta_2, \theta_3, \Phi_{21}, \Phi_{22}, \Phi_{31}$)
$\Phi_{33}$=function($\psi_1, \psi_2, \psi_3, \theta_1, \theta_2, \theta_3, \Phi_{21}, \Phi_{23}, \Phi_{31}$).

The remaining five angles may then be calculated as:

$$\psi_3 = \cos^{-1}\left(\sqrt{1 - \cos^{-2}\psi_1 - \cos^2\psi_2}\right)$$

$$\theta_3 = \cos^{-1}\left(\frac{\sqrt{1 - \sin^2\psi_1\cos^2\theta_1 - \sin^2\psi_2\cos^2\theta_2}}{\sin\psi_3}\right)$$

$$e^{j\phi_{23}} = -\frac{\cos\psi_1\sin\psi_1\cos\theta_1 e^{j\phi_{21}} + \cos\psi_2\sin\psi_2\cos\theta_2 e^{j\phi_{22}}}{\cos\psi_3\sin\psi_3\cos\theta_3}$$

$$e^{j\phi_{32}} = -\frac{\cos\psi_1\cos\psi_2 + \sin\psi_1\cos\theta_1\sin\psi_2\cos\theta_2 e^{j(\phi_{22}-\phi_{21})}}{\sin\psi_1\sin\theta_1\sin\psi_2\sin\theta_2}e^{j\phi_{31}}$$

$$e^{j\phi_{32}} = -\frac{\cos\psi_1\cos\psi_3 + \sin\psi_1\cos\theta_1\sin\psi_3\cos\theta_3 e^{j(\phi_{23}-\phi_{21})}}{\sin\psi_1\sin\theta_1\sin\psi_3\sin\theta_3}e^{j\phi_{31}}$$

Figure 8:
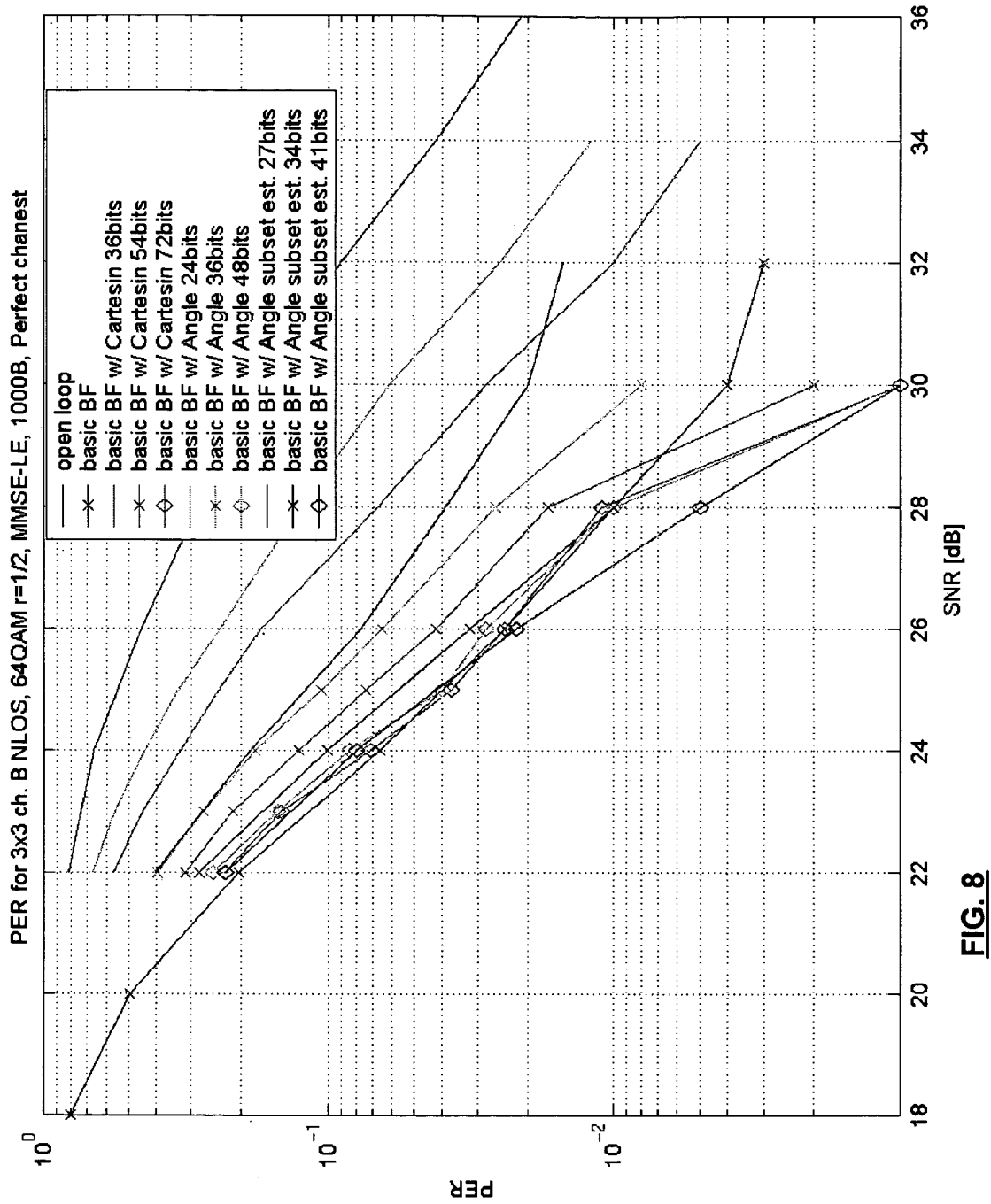
FIG. 8 is a diagram of additional simulation results in accordance with the present invention.

With angle resolution of $\pi/2^a$, where a equals the number of bits per angle, the total number of bits per tone is $2(a-1)+2(a-1)+3(a+1)=7a-1$. The bits may be divided such that the $\psi V$ angles are each assigned "a−1" bits to cover $[0, \pi/2]$, the $\theta$ angles are each assigned "a−1" bits to cover $[0, \pi/2]$, and the $\Phi$ angles are each assigned "a+1" bits to cover $[0, 2\pi]$. In simulation, as shown in FIG. 8, a=6 is enough to achieve full resolution beamforming, thus 41 bits per tone for a 3×3 V(f). For full angle feedback (i.e., send all twelve angles in the feedback signal), each angle needs 4 bits such that the 12 angles require 48 bits per tone. In comparison, a Cartesian coordinate feedback signal would require 72 bits for compatible performance (4*9*2=72, 4 bits for 9 elements with real/imaginary components per each tone).

For a 4×4 MIMO communication, the beamforming unitary matrix may be:

$$V = \begin{bmatrix} \cos\psi_1\cos\varphi_1 & \cos\psi_2\cos\varphi_2 & \cos\psi_3\cos\varphi_3 & \cos\psi_4\cos\varphi_4 \\ \cos\psi_1\sin\varphi_1 e^{j\phi_{11}} & \cos\psi_2\sin\varphi_2 e^{j\phi_{12}} & \cos\psi_3\sin\varphi_3 e^{j\phi_{13}} & \cos\psi_4\sin\varphi_4 e^{j\phi_{14}} \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} & \sin\psi_4\cos\theta_4 e^{j\phi_{24}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} & \sin\psi_4\sin\theta_4 e^{j\phi_{34}} \end{bmatrix}$$

wherein $\psi_1, \psi_2, \psi_3, \psi_4, \theta_1, \theta_2, \theta_3, \theta_4, \phi_1, \phi_2, \phi_3, \phi_4, \Phi_{11}, \Phi_{12}, \Phi_{13}, \Phi_{14}, \Phi_{21}, \Phi_{22}, \Phi_{23}, \Phi_{24}, \Phi_{31}, \Phi_{32}, \Phi_{33}, \Phi_{34}, \Phi_{41}, \Phi_{42},$ $\Phi_{43}, \Phi_{44}$ represent angles of the unit circle, wherein Diagonal $(V^*V)=1$ s, and wherein:

$$\psi_i = \cos^{-1}\left(\sqrt{|V_{1i}|^2 + |V_{2i}|^2}\right), \varphi_i = \cos^{-1}\left(\frac{V_{1i}}{\cos\psi_i}\right), \theta_i = \cos^{-1}\left|\frac{V_{3i}}{\sin\psi_i}\right|$$

$$\phi_{1i} = \angle(V_{2i}), \phi_{2i} = \angle(V_{3i}), \phi_{3i} = \angle(V_{4i})$$

In this example, with 24 angles, the beamforming module 132 may regenerate V as a 4×4 matrix per tone. With 4-bits for expression for the angles, a 54 tone signal may have feedback information of 648 bytes (e.g., 4×24×54/8).

As an alternate example, only sixteen of the twenty-four angles need to be included in the feedback signal and the beamforming module can calculate the remaining eight angles. In this example, to accommodate the various possible V values, the angles should range from $\psi$ in $[0, \pi/2]$, $\phi$ in $[0, \pi/2]$, $\theta$ in $[0, \pi/2]$, $\Phi$ in $[0, 2\pi]$ In order to satisfy $V^*V=VV^*=I$, $\psi_4$=function($\psi_1, \psi_2, \psi_3$)
$\phi_4$=function($\psi_1, \psi_2, \psi_3, \psi_4, \phi_1, \phi_2, \phi_3$)
$\theta_4$=function($\psi_1, \psi_2, \psi_3, \psi_4, \theta_1, \theta_2, \theta_3$)
$\Phi_{14}$=function($\psi_1, \psi_2, \psi_3, \psi_4, \theta_1, \theta_2, \theta_3, \theta_4, \Phi_{11}, \Phi_{12}, \Phi_{13}$)
$\Phi_{24}$=function($\psi_1, \psi_2, \psi_3, \psi_4, \theta_1, \theta_2, \theta_3, \theta_4, \Phi_{21}, \Phi_{22}, \Phi_{23}$)
$\Phi_{32}$=function($\psi_1, \psi_2, \theta_1, \theta_2, \phi_1, \phi_2, \Phi_{21}, \Phi_{22}, \Phi_{31}$);
$\Phi_{33}$=function($\psi_1, \psi_3, \theta_1, \theta_3, \phi_1, \phi_3, \Phi_{21}, \Phi_{23}, \Phi_{31}$);
$\Phi_{34}$=function($\psi_1, \psi_4, \theta_1, \theta_4, \phi_1, \phi_4, \Phi_{21}, \Phi_{24}, \Phi_{31}$).

In accordance with this example, $\psi_1, \psi_2, \psi_3, \psi_4, \theta_1, \theta_2, \theta_3,$ $\theta_4, \phi_1, \phi_2, \phi_3, \phi_4, \Phi_{11}, \Phi_{12}, \Phi_{13}, \Phi_{14}, \Phi_{21}, \Phi_{22}, \Phi_{23}, \Phi_{24}, \Phi_{31},$ $\Phi_{32}, \Phi_{33}, \Phi_{34}$ represent the set of angles, wherein $\psi_1, \psi_2, \psi_3,$ $\theta_1, \theta_2, \theta_3, \phi_1, \phi_2, \phi_3, \Phi_{11}, \Phi_{12}, \Phi_{13}, \Phi_{21}, \Phi_{22}, \Phi_{23}, \Phi_{31},$ are the subset of angles. Angles $\psi_4, \theta_4, \phi_4, \Phi_{14}, \Phi_{24}, \Phi_{31}, \Phi_{32},$ $\Phi_{33}, \Phi_{34}$ are determined by:

$$\psi_4 = \cos^{-1}\left(\sqrt{2 - \cos^2\psi_1 - \cos^2\psi_2 - \cos^2\psi_3}\right)$$

$$\varphi_4 = \cos^{-1}\left(\frac{\sqrt{1 - \cos^2\psi_1\cos^2\varphi_1 - \cos^2\psi_2\cos^2\varphi_2 - \cos^2\psi_3\cos^2\varphi_3}}{\cos\psi_4}\right)$$

$$\theta_4 = \cos^{-1}\left(\frac{\sqrt{1 - \sin^2\psi_1\cos^2\theta_1 - \sin^2\psi_2\cos^2\theta_2 - \sin^2\psi_3\cos^2\theta_3}}{\sin\psi_4}\right)$$

$$e^{j\phi_{14}} = -\frac{\cos^2\psi_1\sin\varphi_1\cos\varphi_1 e^{j\phi_{11}} + \cos^2\psi_2\sin\varphi_2\cos\varphi_2 e^{j\phi_{12}} + \cos^2\psi_3\sin\varphi_3\cos\varphi_3 e^{j\phi_{13}}}{\cos^2\psi_4\sin\varphi_4\cos\varphi_4}$$

$$e^{j\phi_{24}} = -\frac{\cos\psi_1\sin\psi_1\cos\varphi_1\cos\theta_1 e^{j\phi_{21}} + \cos\psi_2\sin\psi_2\cos\varphi_2\cos\theta_2 e^{j\phi_{22}} + \cos\psi_3\sin\psi_3\cos\varphi_3\cos\theta_3 e^{j\phi_{23}}}{\cos\psi_4\sin\psi_4\cos\varphi_4\cos\theta_4}$$

$$e^{j\phi_{32}} = $$

$$-\frac{\cos\psi_1\cos\psi_2\cos\varphi_1\cos\varphi_2 + \cos\psi_1\cos\psi_2\sin\varphi_1\sin\varphi_2 e^{j(\phi_{12}-\phi_{11})} + \sin\psi_1\cos\theta_1\sin\psi_2\cos\theta_2 e^{j(\phi_{22}-\phi_{21})}}{\sin\psi_1\sin\theta_1\sin\psi_2\sin\theta_2}$$

$$e^{j\phi_{31}}$$

$$e^{j\phi_{33}} = $$

$$-\frac{\cos\psi_1\cos\psi_3\cos\varphi_1\cos\varphi_3 + \cos\psi_1\cos\psi_3\sin\varphi_1\sin\varphi_3 e^{j(\phi_{13}-\phi_{11})} + \sin\psi_1\cos\theta_1\sin\psi_3\cos\theta_3 e^{j(\phi_{23}-\phi_{21})}}{\sin\psi_1\sin\theta_1\sin\psi_3\sin\theta_3}$$

$$e^{j\phi_{31}}$$

-continued $$e^{j\phi_{34}} = $$

$$-\frac{\cos\psi_1\cos\psi_4\cos\varphi_1\cos\varphi_4 + \cos\psi_1\cos\psi_4\sin\varphi_1\sin\varphi_4 e^{j(\phi_{14}-\phi_{11})} + \sin\psi_1\cos\theta_1\sin\psi_4\cos\theta_4 e^{j(\phi_{24}-\phi_{21})}}{\sin\psi_1\sin\theta_1\sin\psi_4\sin\theta_4}$$

$$e^{j\phi_{31}}$$

With angle resolution of π/2a, where a equals the number of bits per angle, the total number of bits per tone is 3(a−1)+3(a−1)+3(a−1)+7(a+1)=16a−2. The bits may be allocated such that each ψ angle is assigned "a−1" bits, each (p angle is assigned "a−1" bits to cover [0, π/2], each θ is assigned "a−1" bits to cover [0, π/2], and each Φ angle is assigned "a+1" bits to cover [0, 2π]. In this example, an "a" equal to 5 may be enough to achieve full resolution beamforming performance, such that 62 bits per tone are needed for 4×4 V(f). In comparison with the same resolution of 4 bits per each element for Cartesian coordinates, 128 bits per tone are required; 4 bits for 16 elements with real/imaginary components.

Figure 5:
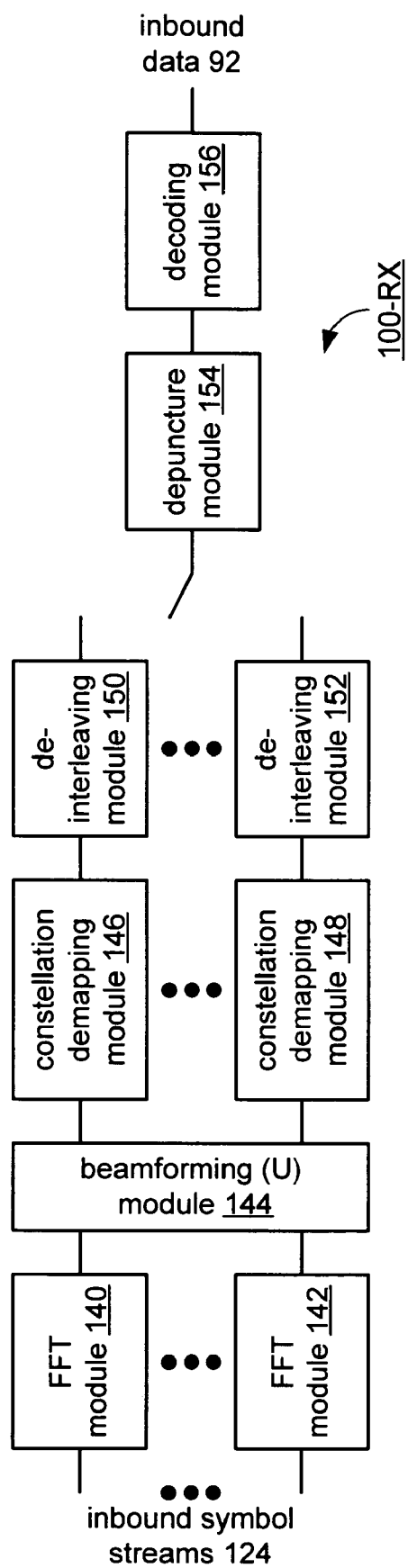
FIG. 5 is a schematic block diagram of baseband receive processing in accordance with the present invention.
Figure 6:
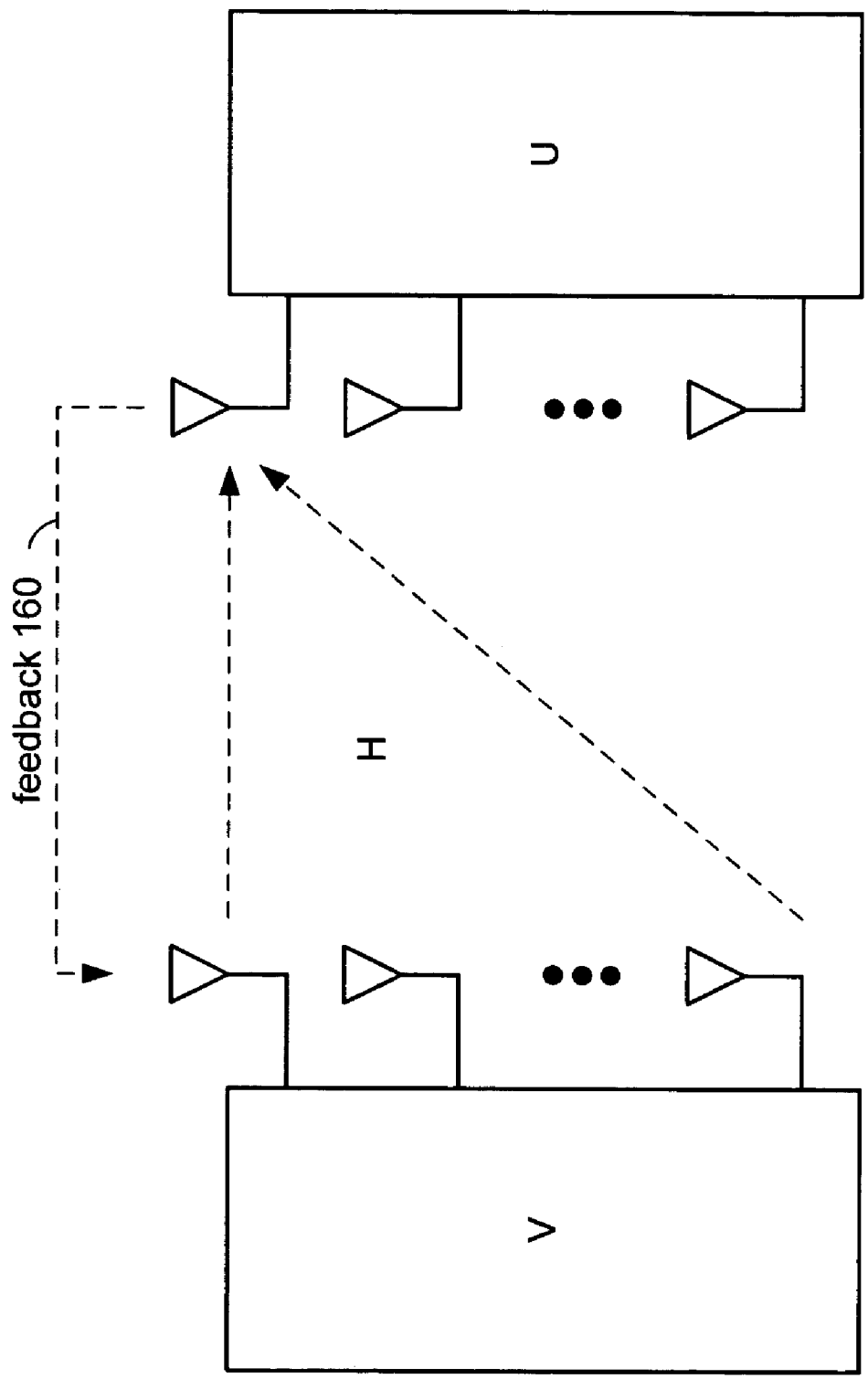
FIG. 6 is a schematic block diagram of a beamforming wireless communication in accordance with the present invention.

FIG. 5 is a schematic block diagram of baseband receive processing 100-RX that includes a plurality of fast Fourier transform (FFT) modules 140, 142, a beamforming (U) module 144, a plurality of constellation demapping modules 146, 148, a plurality of deinterleaving modules 150, 152, a switch, a depuncture module 154, and a decoding module 156 for converting a plurality of inbound symbol streams 124 into inbound data 92. As one of ordinary skill in the art will appreciate, the baseband receive processing 100-RX may include two or more of each of the deinterleaving modules 150, 152, the constellation demapping modules 146, 148, and the FFT modules 140, 142. In addition, one of ordinary skill in art will further appreciate that the decoding module 156, depuncture module 154, the deinterleaving modules 150, 152, the constellation decoding modules 146, 148, and the FFT modules 140, 142 may be function in accordance with one or more wireless communication standards including, but not limited to, IEEE 802.11a, b, g, n.

In one embodiment, a plurality of FFT modules 140, 142 is operably coupled to convert a plurality of inbound symbol streams 124 into a plurality of streams of beamformed symbols. The inverse beamforming module 144 is operably coupled to inverse beamform, using a unitary matrix having polar coordinates, the plurality of streams of beamformed symbols into a plurality of streams of data symbols. The plurality of constellation demapping modules is operably coupled to demap the plurality of streams of data symbols into a plurality of interleaved streams of data. The plurality of deinterleaving modules is operably coupled to deinterleave the plurality of interleaved streams of data into encoded data. The decoding module is operably coupled to convert the encoded data into inbound data 92.

In one embodiment, the FFT modules 140, 142 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map. For an OFDM signal, the beamforming module 144 may use the beamforming unitary matrix U for each tone from each FFT module 140, 142, use the same beamforming unitary matrix for each tone from each FFT module 140, 142, or a combination thereof.

The preceding discussion has presented a method and apparatus for reducing feedback information for beamforming in a wireless communication by using polar coordinates. As one of average skill in the art will appreciate, other embodiments may be derived from the present teachings without deviating from the scope of the claims.

What is claimed is:

1. A method for beamforming a wireless communication, the method comprises:
   receiving a baseband signal by a transmitter that includes a plurality of streams;
   receiving a feedback signal by the transmitter from a receiver of the wireless communication that includes a subset of angles $\psi_1$ and $\Phi_1$, wherein a set of angles $\psi_1$ and $\Phi_1$, $\psi_2$, and $\Phi_2$ provide polar coordinates for a unitary 2×2 matrix V, wherein VV*=I and I represents an identity matrix;
   determining the angles $\psi_2$ and $\Phi_2$ based on the subset of angles $\psi_1$ and $\Phi_1$, wherein $\psi_2$ and $\Phi_2$ are determined by solving absolute value of $\psi_1-\psi_2=\pi/2$ and $\Phi_1=\Phi_2$ or $\Phi_1=\Phi_2+\pi$ and $\psi_1+\psi_2=\pi/2$;
   determining the polar coordinates for the unitary matrix based on the set of angles $\psi_1$ and $\Phi_1$, $\psi_2$, and $\Phi_2$; and
   digitally beamforming the plurality of streams of the baseband signal using the unitary matrix to produce a plurality of beamformed symbols.

2. The method of claim 1 wherein receiving the baseband signal that includes a plurality of streams includes:
   encoding data to produce a stream of encoded data;
   interleaving the stream of encoded data into a plurality of parallel streams of interleaved data;
   constellation mapping symbols of each of the plurality of parallel streams of interleaved data to a plurality of parallel tones to produce the plurality of streams of the baseband signal; and
   wherein digitally beamforming the plurality of streams of the baseband signal includes digitally beamforming each of the plurality of parallel tones using the unitary matrix to produce a plurality of beamformed symbols.

3. The method of claim 1, wherein the unitary matrix comprises:
   a plurality of polar coordinates as represented by V, wherein absolute value of each of the plurality of polar coordinates is a vector on a unit circle and each of the polar coordinates is orthogonal to at least one other of the polar coordinates such that VV*=I, where I represents an identity matrix.

4. The method of claim 3, wherein the unitary matrix further comprises for a 2×N, wherein N is equal to the number of receiver antennas, multiple input multiple output (MIMO) wireless communication:

$$V = \begin{bmatrix} \cos\psi_1 & \cos\psi_2 \\ \sin\psi_1 e^{j\phi_1} & \sin\psi_2 e^{j\phi_2} \end{bmatrix}$$

wherein $\psi_1$, $\Phi_1$, $\psi_2$, and $\Phi_2$ represent the set of angles, wherein angles $\psi_1$ and $\Phi_1$ are included in the subset of angles, wherein, $\psi_2$, and $\Phi_2$ are determined by solving absolute value of $\psi_1-\psi_2=\pi/2$ and $\Phi_1=\Phi_2$ or $\Phi_1=\Phi_2+\pi$ and $\psi_1+\psi_2=\pi/2$.

5. The method of claim 3, wherein when the unitary matrix comprises a 3×N, wherein N is equal to the number of receiver antennas, multiple input multiple output (MIMO) wireless communication:

$$V = \begin{bmatrix} \cos\psi_1 & \cos\psi_2 & \cos\psi_3 \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} \end{bmatrix}$$

wherein $\psi_1, \psi_2, \psi_3, \theta_1, \theta_2, \theta_3, \Phi_{21}, \Phi_{22}, \Phi_{23}, \Phi_{31}, \Phi_{32}, \Phi_{33}$ represent the set of angles, wherein $\psi_1, \psi_2, \theta_1, \theta_2, \Phi_{21}, \Phi_{22}$, and $\Phi_{31}$, are included in the subset of angles, wherein Diagonal (VV*)=1 s, and wherein $\psi_3, \theta_3, \Phi_{21}, \Phi_{23}, \Phi_{32}$, and $\Phi_{33}$ are determined by:

$$\psi_3 = \cos^{-1}\left(\sqrt{1-\cos^2\psi_1-\cos^2\psi_2}\right)$$

$$\theta_3 = \cos^{-1}\left(\frac{\sqrt{1-\sin^2\psi_1\cos^2\theta_1-\sin^2\psi_2\cos^2\theta_2}}{\sin\psi_3}\right)$$

$$e^{j\phi_{23}} = -\frac{\cos\psi_1\sin\psi_1\cos\theta_1 e^{j\phi_{21}}+\cos\psi_2\sin\psi_2\cos\theta_2 e^{j\phi_{22}}}{\cos\psi_3\sin\psi_3\cos\theta_3}$$

$$e^{j\phi_{32}} = -\frac{\cos\psi_1\cos\psi_2+\sin\psi_1\cos\theta_1\sin\psi_2\cos\theta_2 e^{j(\phi_{22}-\phi_{21})}}{\sin\psi_1\sin\theta_1\sin\psi_2\sin\theta_2}e^{j\phi_{31}}$$

$$e^{j\phi_{32}} = -\frac{\cos\psi_1\cos\psi_3+\sin\psi_1\cos\theta_1\sin\psi_3\cos\theta_3 e^{j(\phi_{23}-\phi_{21})}}{\sin\psi_1\sin\theta_1\sin\psi_3\sin\theta_3}e^{j\phi_{31}}.$$

6. The method of claim 3, wherein when the unitary matrix comprises a 4×N, wherein N is equal to the number of receiver antennas, multiple input multiple input multiple output (MIMO) wireless communication:

$$V = \begin{bmatrix} \cos\psi_1\cos\varphi_1 & \cos\psi_2\cos\varphi_2 & \cos\psi_3\cos\varphi_3 & \cos\psi_4\cos\varphi_4 \\ \cos\psi_1\sin\varphi_1 e^{j\phi_{11}} & \cos\psi_2\sin\varphi_2 e^{j\phi_{12}} & \cos\psi_3\sin\varphi_3 e^{j\phi_{13}} & \cos\psi_4\sin\varphi_4 e^{j\phi_{14}} \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} & \sin\psi_4\cos\theta_4 e^{j\phi_{24}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} & \sin\psi_4\sin\theta_4 e^{j\phi_{34}} \end{bmatrix}$$

wherein $\psi_1, \psi_2, \psi_3, \psi_4, \theta_1, \theta_2, \theta_3, \theta_4, \varphi_1, \varphi_2, \varphi_3, \varphi_4, \Phi_{11}, \Phi_{12}, \Phi_{13}, \Phi_{14}, \Phi_{21}, \Phi_{22}, \Phi_{23}, \Phi_{24}, \Phi_{31}, \Phi_{32}, \Phi_{33}, \Phi_{34}$ represent the set of angles, wherein $\psi_1, \psi_2, \psi_3, \theta_1, \theta_2, \theta_3, \varphi_1, \varphi_2, \varphi_3, \Phi_{11}, \Phi_{12}, \Phi_{13}, \Phi_{21}, \Phi_{22}, \Phi_{23}, \Phi_{31}$, are the subset of angles, wherein $\psi_4, \theta_4, \varphi_4, \Phi_{14}, \Phi_{24}, \Phi_{31}, \Phi_{32}, \Phi_{33}, \Phi_{34}$ are determined by:

$$\psi_4 = \cos^{-1}\left(\sqrt{2-\cos^2\psi_1-\cos^2\psi_2-\cos^2\psi_3}\right)$$

$$\varphi_4 = \cos^{-1}\left(\frac{\sqrt{1-\cos^2\psi_1\cos^2\varphi_1-\cos^2\psi_2\cos^2\varphi_2-\cos^2\psi_3\cos^2\varphi_3}}{\cos\psi_4}\right)$$

$$\theta_4 = \cos^{-1}\left(\frac{\sqrt{1-\sin^2\psi_1\cos^2\theta_1-\sin^2\psi_2\cos^2\theta_2-\sin^2\psi_3\cos^2\theta_3}}{\sin\psi_4}\right)$$

$$e^{j\phi_{14}} = -\frac{\cos^2\psi_1\sin\varphi_1\cos\varphi_1 e^{j\phi_{11}} + \cos^2\psi_2\sin\varphi_2\cos\varphi_2 e^{j\phi_{12}} + \cos^2\psi_3\sin\varphi_3\cos\varphi_3 e^{j\phi_{13}}}{\cos^2\psi_4\sin\varphi_4\cos\varphi_4}$$

$$e^{j\phi_{24}} = -\frac{\cos\psi_1\sin\psi_1\cos\varphi_1\cos\theta_1 e^{j\phi_{21}} + \cos\psi_2\sin\psi_2\cos\varphi_2\cos\theta_2 e^{j\phi_{22}} + \cos\psi_3\sin\psi_3\cos\varphi_3\cos\theta_3 e^{j\phi_{23}}}{\cos\psi_4\sin\psi_4\cos\varphi_4\cos\theta_4}$$

$$e^{j\phi_{32}} = -\frac{\cos\psi_1\cos\psi_2\cos\varphi_1\cos\varphi_2 + \cos\psi_1\cos\psi_2\sin\varphi_1\sin\varphi_2 e^{j(\phi_{12}-\phi_{11})} + \sin\psi_1\cos\theta_1\sin\psi_2\cos\theta_2 e^{j(\phi_{22}-\phi_{21})}}{\sin\psi_1\sin\theta_1\sin\psi_2\sin\theta_2}e^{j\phi_{31}}$$

$$e^{j\phi_{33}} = -\frac{\cos\psi_1\cos\psi_3\cos\varphi_1\cos\varphi_3 + \cos\psi_1\cos\psi_3\sin\varphi_1\sin\varphi_3 e^{j(\phi_{13}-\phi_{11})} + \sin\psi_1\cos\theta_1\sin\psi_3\cos\theta_3 e^{j(\phi_{23}-\phi_{21})}}{\sin\psi_1\sin\theta_1\sin\psi_3\sin\theta_3}e^{j\phi_{31}}$$

$$e^{j\phi_{34}} = -\frac{\cos\psi_1\cos\psi_4\cos\varphi_1\cos\varphi_4 + \cos\psi_1\cos\psi_4\sin\varphi_1\sin\varphi_4 e^{j(\phi_{14}-\phi_{11})} + \sin\psi_1\cos\theta_1\sin\psi_4\cos\theta_4 e^{j(\phi_{24}-\phi_{21})}}{\sin\psi_1\sin\theta_1\sin\psi_4\sin\theta_4}e^{j\phi_{31}}.$$

7. A transmit baseband processing module comprises:
an encoding module operably coupled to convert outbound data into encoded data;
a plurality of interleaving modules operably coupled to interleave the encoded data into a plurality of interleaved streams of data;
a plurality of constellation mapping modules operably coupled to map the plurality of interleaved streams of data into a plurality of streams of data symbols;
a beamforming module operably coupled to:
  obtain a feedback signal that includes a subset of angles $\psi_1$ and $\Phi_1$, wherein a set of angles $\psi_1$ and $\Phi_1$, $\psi_2$, and $\Phi_2$ provide polar coordinates for a unitary 2×2 matrix V, wherein VV*=I and I represents an identity matrix;
  determine the angles $\psi_2$ and $\Phi_2$ based on the subset of angles $\psi_1$ and $\Phi_1$, wherein $\psi_2$ and $\Phi_2$ are determined by solving absolute value of $\psi_1-\psi_2=\pi/2$ and $\Phi_1=\Phi_2$ or $\Phi_1=\Phi_2+\pi$ and $\psi_1+\psi_2=\pi/2$;
  determine the polar coordinates for the unitary matrix based on the set of angles $\psi_1$ and $\Phi_1$, $\psi_2$, and $\Phi_2$; and
  digitally beamform, using the unitary matrix having polar coordinates, the plurality of streams of data symbols into a plurality of streams of beamformed symbols; and
a plurality of inverse fast Fourier transform modules operably coupled to convert the plurality of streams of beamformed symbols into a plurality of outbound symbol streams.

8. The transmit baseband processing module of claim 7, wherein the unitary matrix comprises:
a plurality of polar coordinates as represented by V, wherein absolute value of each of the plurality of polar coordinates is a vector on a unit circle and each of the polar coordinates is orthogonal to at least one other of the polar coordinates such that VV*=I, where I represents an identity matrix.

9. The transmit baseband processing module of claim 8, wherein the unitary matrix further comprises for a 2×N, wherein N is equal to the number of receiver antennas, multiple input multiple output (MIMO) wireless communication:

$$V = \begin{bmatrix} \cos\psi_1 & \cos\psi_2 \\ \sin\psi_1 e^{j\phi_1} & \sin\psi_2 e^{j\phi_2} \end{bmatrix}$$

wherein $\psi_1, \Phi_1, \psi_2$, and $\Phi_2$ represent the set of angles, wherein angles $\psi_1$ and $\Phi_1$ are included in the subset of angles, wherein, $\psi_2$, and $\Phi_2$ are determined by solving absolute value of $\psi_1-\psi_2=\pi/2$ and $\Phi_1=\Phi_2$ or $\Phi_1=\Phi_2+\pi$ and $\psi_1+\psi_2=\pi/2$.

10. The transmit baseband processing module of claim 8, wherein the unitary matrix further comprises for a 3×N, wherein N is equal to the number of receiver antennas, multiple input multiple output (MIMO) wireless communication:

$$V = \begin{bmatrix} \cos\psi_1 & \cos\psi_2 & \cos\psi_3 \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} \end{bmatrix}$$

wherein $\psi_1, \psi_2, \psi_3, \theta_1, \theta_2, \theta_3, \Phi_{21}, \Phi_{22}, \Phi_{23}, \Phi_{31}, \Phi_{32}, \Phi_{33}$ represent the set of angles, wherein $\psi_1, \psi_2, \theta_1, \theta_2, \Phi_{21}, \Phi_{22}$, and $\Phi_{31}$, are included in the subset of angles, wherein (V V*)=1 s, and wherein $\psi_3, \theta_3, \Phi_{21}, \Phi_{23}, \Phi_{32}$, and $\Phi_{33}$ are determined by:

$$\psi_3 = \cos^{-1}\left(\sqrt{1 - \cos^2\psi_1 - \cos^2\psi_2}\right)$$

$$\theta_3 = \cos^{-1}\left(\frac{\sqrt{1 - \sin^2\psi_1\cos^2\theta_1 - \sin^2\psi_2\cos^2\theta_2}}{\sin\psi_3}\right)$$

$$e^{j\phi_{23}} = -\frac{\cos\psi_1\sin\psi_1\cos\theta_1 e^{j\phi_{21}} + \cos\psi_2\sin\psi_2\cos\theta_2 e^{j\phi_{22}}}{\cos\psi_3\sin\psi_3\cos\theta_3}$$

$$e^{j\phi_{32}} = -\frac{\cos\psi_1\cos\psi_2 + \sin\psi_1\cos\theta_1\sin\psi_2\cos\theta_2 e^{j(\phi_{22}-\phi_{21})}}{\sin\psi_1\sin\theta_1\sin\psi_2\sin\theta_2} e^{j\phi_{31}}$$

$$e^{j\phi_{32}} = -\frac{\cos\psi_1\cos\psi_3 + \sin\psi_1\cos\theta_1\sin\psi_3\cos\theta_3 e^{j(\phi_{23}-\phi_{21})}}{\sin\psi_1\sin\theta_1\sin\psi_3\sin\theta_3} e^{j\phi_{31}}.$$

11. The transmit baseband processing module of claim 8, wherein the unitary matrix further comprises for a 4×N, wherein N is equal to the number of receiver antennas, multiple input multiple output (MIMO) wireless communication:

$$V = \begin{bmatrix} \cos\psi_1\cos\varphi_1 & \cos\psi_2\cos\varphi_2 & \cos\psi_3\cos\varphi_3 & \cos\psi_4\cos\varphi_4 \\ \cos\psi_1\sin\varphi_1 e^{j\phi_{11}} & \cos\psi_2\sin\varphi_2 e^{j\phi_{12}} & \cos\psi_3\sin\varphi_3 e^{j\phi_{13}} & \cos\psi_4\sin\varphi_4 e^{j\phi_{14}} \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} & \sin\psi_4\cos\theta_4 e^{j\phi_{24}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} & \sin\psi_4\sin\theta_4 e^{j\phi_{34}} \end{bmatrix}$$

wherein $\psi_1, \psi_2, \psi_3, \psi_4, \theta_1, \theta_2, \theta_3, \theta_4, \phi_1, \phi_2, \phi_3, \phi_4, \Phi_{11}, \Phi_{12}, \Phi_{13}, \Phi_{14}, \Phi_{21}, \Phi_{22}, \Phi_{23}, \Phi_{24}, \Phi_{31}, \Phi_{32}, \theta_{33}, \Phi_{34}$ represent the set of angles, wherein $\psi_1, \psi_2, \psi_3, \theta_1, \theta_2, \theta_3, \phi_1, \phi_2, \phi_3, \Phi_{11}, \Phi_{12}, \Phi_{13}, \Phi_{21}, \Phi_{22}, \Phi_{23}, \Phi_{31}$, are the subset of angles, wherein $\psi_4, \theta_4, \phi_4, \Phi_{14}, \Phi_{24}, \Phi_{31}, \Phi_{32}, \Phi_{33}, \Phi_{34}$ are determined by:

$$\psi_4 = \cos^{-1}\left(\sqrt{2 - \cos^2\psi_1 - \cos^2\psi_2 - \cos^2\psi_3}\right)$$

$$\varphi_4 = \cos^{-1}\left(\frac{\sqrt{1 - \cos^2\psi_1\cos^2\varphi_1 - \cos^2\psi_2\cos^2\varphi_2 - \cos^2\psi_3\cos^2\varphi_3}}{\cos\psi_4}\right)$$

$$\theta_4 = \cos^{-1}\left(\frac{\sqrt{1 - \sin^2\psi_1\cos^2\theta_1 - \sin^2\psi_2\cos^2\theta_2 - \sin^2\psi_3\cos^2\theta_3}}{\sin\psi_4}\right)$$

$$e^{j\phi_{14}} = -\frac{\cos^2\psi_1\sin\varphi_1\cos\varphi_1 e^{j\phi_{11}} + \cos^2\psi_2\sin\varphi_2\cos\varphi_2 e^{j\phi_{12}} + \cos^2\psi_3\sin\varphi_3\cos\varphi_3 e^{j\phi_{13}}}{\cos^2\psi_4\sin\varphi_4\cos\varphi_4}$$

$$e^{j\phi_{24}} = -\frac{\cos\psi_1\sin\psi_1\cos\varphi_1\cos\theta_1 e^{j\phi_{21}} + \cos\psi_2\sin\psi_2\cos\varphi_2\cos\theta_2 e^{j\phi_{22}} + \cos\psi_3\sin\psi_3\cos\varphi_3\cos\theta_3 e^{j\phi_{23}}}{\cos\psi_4\sin\psi_4\cos\varphi_4\cos\theta_4}$$

$$e^{j\phi_{32}} = -\frac{\cos\psi_1\cos\psi_2\cos\varphi_1\cos\varphi_2 + \cos\psi_1\cos\psi_2\sin\varphi_1\sin\varphi_2 e^{j(\phi_{12}-\phi_{11})} + \sin\psi_1\cos\theta_1\sin\psi_2\cos\theta_2 e^{j(\phi_{22}-\phi_{21})}}{\sin\psi_1\sin\theta_1\sin\psi_2\sin\theta_2} e^{j\phi_{31}}$$

$$e^{j\phi_{33}} = -\frac{\cos\psi_1\cos\psi_3\cos\varphi_1\cos\varphi_3 + \cos\psi_1\cos\psi_3\sin\varphi_1\sin\varphi_3 e^{j(\phi_{13}-\phi_{11})} + \sin\psi_1\cos\theta_1\sin\psi_3\cos\theta_3 e^{j(\phi_{23}-\phi_{21})}}{\sin\psi_1\sin\theta_1\sin\psi_3\sin\theta_3} e^{j\phi_{31}}$$

$$e^{j\phi_{34}} = -\frac{\cos\psi_1\cos\psi_4\cos\varphi_1\cos\varphi_4 + \cos\psi_1\cos\psi_4\sin\varphi_1\sin\varphi_4 e^{j(\phi_{14}-\phi_{11})} + \sin\psi_1\cos\theta_1\sin\psi_4\cos\theta_4 e^{j(\phi_{24}-\phi_{21})}}{\sin\psi_1\sin\theta_1\sin\psi_4\sin\theta_4} e^{j\phi_{31}}.$$

* * * * *

UNITED STATES PATENT AND TRADEMARK OFFICE
CERTIFICATE OF CORRECTION

| | | |
|---|---|---|
| PATENT NO. | : 7,738,584 B2 | Page 1 of 1 |
| APPLICATION NO. | : 11/168838 | |
| DATED | : June 15, 2010 | |
| INVENTOR(S) | : Joonsuk Kim | |

It is certified that error appears in the above-identified patent and that said Letters Patent is hereby corrected as shown below:

Title Page, Item (73): Assignee: Delete "Company", insert --Corporation--

Column 17, line 14 in Claim 10, after "angles, wherein" insert --Diagonal--

Signed and Sealed this
Thirteenth Day of March, 2012

David J. Kappos
*Director of the United States Patent and Trademark Office*